March 21, 1939.     N. L. RICHARDS     2,151,617
FIXED DIMENSION GAUGE
Filed May 12, 1937
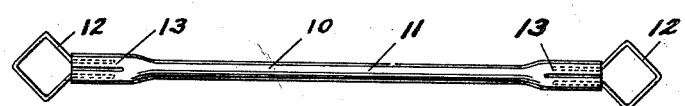
Fig. I.
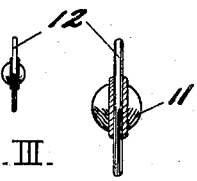
Fig. III.   Fig. IV.
Fig. II.
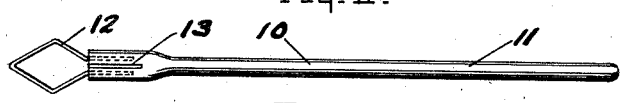
Fig. V.
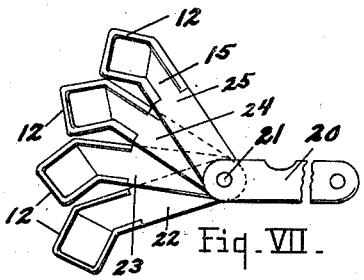
Fig. VII.
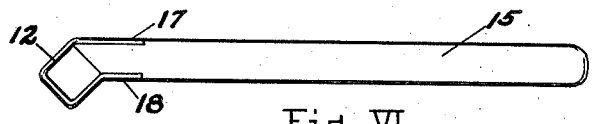
Fig. VI.
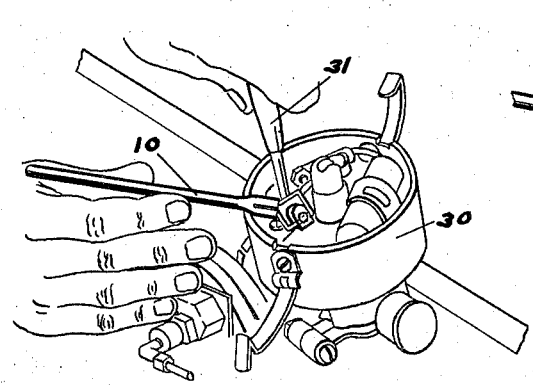
Fig. VIII.
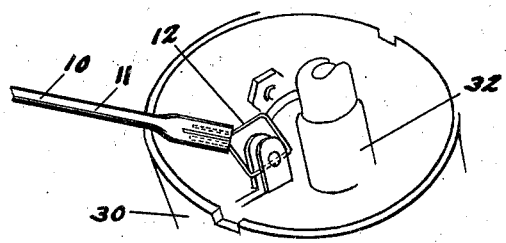
Fig. IX.
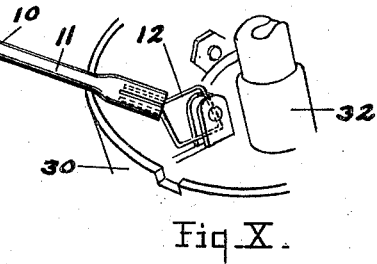
Fig. X.
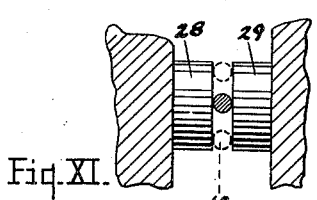
Fig. XI.
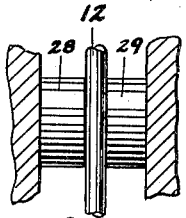
Fig. XII.
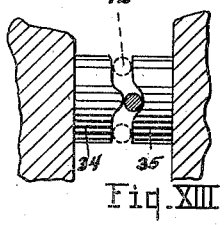
Fig. XIII.
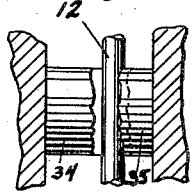
Fig. XIV.
INVENTOR.
NORTON L. RICHARDS
BY
ATTORNEY.

Patented Mar. 21, 1939

2,151,617

UNITED STATES PATENT OFFICE 2,151,617

FIXED DIMENSION GAUGE

Norton L. Richards, Chicago, Ill.

Application May 12, 1937, Serial No. 142,233

2 Claims. (Cl. 33—168)

This invention relates broadly to improvements in non-adjustable gauges for accurately determining whether or not spaces between members are of the desired size, and is more particularly directed to gauges for indicating accurately the proper gap distance between bodies having opposite parallel surfaces. These gauges are especially intended for adjusting breaker points on distributors, but are of general application.

Another object of my invention is the provision of light weight gauges having tubular handles and gauge wires as an integral part thereof, the gauging contacts consisting solely in the cylindrical portions of said wires, the lightness of said gauges increasing the magnitude of the desired touch; said gauges are preferably made in sets of sizes, for example one gauge for each difference of a thousandth of an inch within a desired given range; generally between twelve thousandths and twenty-five thousandths of an inch.

Another object of my invention is the provision of fixed dimension gauges for the above stated reasons which can be inexpensively manufactured and which will give the same accuracy or even greater accuracy than those heretofore known.

This invention further relates to the novel arrangement and combination of the handles and the wire measuring portions of my improved fixed-dimension gauges.

To fully explain the advantages of my invention I shall refer briefly to well-known types of fixed dimension gauges.

The most common type of gauge for measuring gap distances is the flat blade type or feeler gauge, generally consisting of a plurality of gauge blades which are pivotally mounted in a handle and so arranged that any one of the blades may be quickly moved into operative position. The actual part of the gauge which is in contact with the substantially parallel surfaces of object to be measured is another flat or plain area, thus providing a plurality of contact points and resulting in the possibility of a plurality of errors. This type gauge gives an untrue "touch" and therefore an unreliable measurement.

The tolerance type gauge having a gauging sphere at one extremity and a handle at the other extremity is often used for measuring gap distances. This type gauge gives only a single point contact on each side of said sphere which is very unsatisfactory when measuring the gap distance at or about the peripherial edges of parallel surfaces, and it being almost impossible at any time to feel by "touch" the maximum diameter contact point.

This invention having wires for gauging means with cylindrical portions, provides all the advantages of the common type gauges but eliminating the disadvantages of said gauges. Cylindrical gauge portions give a true feeling or "touch" and of greater magnitude; the result being obtained from having a line contact or a plurality of contact points all in a straight line, the efficiency of using a plurality of spherical surfaces but eliminating the disadvantages thereof.

This invention possesses other advantageous features, which, with the foregoing will be set forth at length in the following description, where I shall outline in full that form of embodiment of the invention which has been selected for illustration in the drawing accompanying and forming part of the present specification. The novelty of the invention will be included in the claims succeeding said description. From this it will be apparent that I do not restrict myself to the showing made by such drawing and descriptions, as I may adopt many variations within the scope of my invention as expressed in said claims.

Reference is to be had to the accompanying drawing in which I have illustrated various forms of my invention, showing different ways in which the handle may be secured to the wire gauging member to facilitate the use of said gauge. The wire gauging member is shown attached to one or both ends of said handle, said wire being formed in a loop of non-alterable shape with an open center section to permit rolling of the gauge between the thumb and first fingers of the operator, said gauging member is generally in line with the handle, however it is often affixed to the handle at an angle therewith where space is limited. It is evident that other forms might be designed and that my invention in its broad aspect is not to be limited to any one of the specific forms shown.

In the drawing:

Figure I is a plan view of a novel form of my gauging instrument with separate gauging members secured at opposite ends of a tubular handle member thereof.

Figure II is a side view of the gauging instrument shown in Figure I.

Figure III is an end view of the gauging instrument shown in Figure I.

Figure IV is an enlarged view of Figure III.

Figure V is a view similar to that shown in Figure I, with a modified form of gauging member, the wire loop gauging member is formed in the shape of an extended diamond, and secured at one end of a tubular handle member.

Figure VI is a plan view of a modified form of gauging instrument, the wire loop gauging member being of rectangular shape and formed at an angle with respect to the axis of the handle member.

Figure VII shows a modified form of my invention showing a set or a plurality of relative rotatable gauges secured together, the gauges are shown extending from an auxiliary handle or case which is adapted to enclose the entire set of gauges.

Figure VIII is a perspective view showing the manner in which the gauging instrument is applied to the breaker points on a distributor, in one hand is shown the gauging instrument held between the thumb and first finger and with the wire gauging means positioned between the contact or breaker points thereof; in the opposite hand is shown a screw-driver in position to adjust the eccentric screw provided for adjusting the distance or gap between the contact points when said points are in maximum open position.

Figure IX is an enlarged fragmentary view of that shown in Figure VIII, showing the position of one section of the gauging member with respect to the distributor and the distributor contact points thereof.

Figure X is a view similar to that shown in Figure IX but showing the gauging means in a different position, a different section of the gauge member is shown with respect to the distributor and distributor contact points thereof.

Figure XI is an enlarged fragmentary side view of a pair of contact breaker points, showing the wire gauge in section, and in a horizontal position with respect thereto, showing the accurate point or line contact on each side of said wire gauge member.

Figure XII is a top view of the contact points and gauge member shown in Figure XI, showing the accurate line contact on each side of said wire gauge member.

Figure XIII is a view similar to that shown in Figure XI, except the wire gauge is shown in position and with respect to contact points having burned or irregular surfaces, said surfaces needing to be "trued" so that their contact surfaces will be exactly parallel.

Figure XIV is a top view of the contact points and gauge member shown in Figure XIII, showing the gauging member in contact with the burned surfaces.

Similar reference numerals designate like parts throughout all the figures of the drawing. Referring to the drawing in detail, I have illustrated the gauging instrument 10 in several views as having a tubular handle 11 with a wire gauging member 12 secured at one or both ends of said handle 11, said members 11 and 12 are secured together at 13 in any suitable manner, as for instance being crimped, swedged, soldered, welded, brazed, or frictionally held together. Said wire member 12, when positioned at both ends of the handle may be of the same size or they may be of different sizes. While the gauge wires at each end of the handle have been given the same reference character, namely 12, they may be the same or each different in diametrical sizes from the other. On the handle adjacent the wire gauge member 12, may be stamped the size of the gauge wire for reference purposes.

Instead of using a tubular handle 11, as shown in all the figures except Figures VI and VII, said handle may be solid and of any desired configuration. In Figure VI I have shown a slightly different form of handle, a flat, bladelike handle 15 with the wire gauging member 12 secured at one end thereof, said end portions of the wire gauging member 12 soldered or otherwise secured by any suitable means at 17 and 18 to the sides or end portions of said handle 15.

In Figure VII I have illustrated a plurality of gauging instruments 22, 23, 24 and 25 similar to the type of gauge shown in Figure VI, having handles 15 and gauge members 12 pivotally held in a case 20 by means of pivot 21, said gauges extending out of one or both ends of the case 20, the pivot cooperating with the case to frictionally clamp the gauges in any desired position of rotative adjustment. Said wire gauging members 12 preferably progressively increasing in size from the gauge adjacent one side of the case 20 to the last gauge adjacent the opposite side of said case; as for example, gauge member 22 being the smallest and gauge member 25 the largest.

In Figures VIII, IX, X, XI, XII, XIII and XIV is illustrated the use of the gauge of my invention with respect to breaker contact points on a distributor. In Figure VIII the gauge 10 is shown between the thumb and first finger of an operator and showing the gauging member 12 placed between contact points 28 and 29 shown on a distributor 30. A screw driver or tool 31 is shown in position for operation so as to turn an eccentric adjusting screw not shown, to the right or left, increasing or decreasing the gap between points 28 and 29 to the desired distance, said contact point setting or gap for most distributors being at or about (.018") eighteen one thousandths of an inch. This gap measurement may run from twelve thousandths to twenty-five thousandths inches according to its use. These contact surfaces must be exactly parallel for a large contact surface permits a greater or more efficient charge of current to flow through the primary circuit of the ignition coil giving a more efficient result.

Distributor contact points are generally arranged or installed within small or restricted openings on the distributor and in such a manner that the usual flat blade type feeler gauge can only be inserted between said points in one direction and therefore can not give the operator the desired "touch" therefore resulting in an incorrect adjustment. With my novel type gauge the wire gauging member, as shown in Figures VIII and IX, may be passed up and down between the contact points to test the gap distance, a true "touch" is obtained as the operator can roll the gauge 10 within his fingers due to the center opening of the wire loop, and any irregular surfaces are easily detected. The operator may test the points and gap clearance by drawing the gauging member 12 laterally, toward or away from the post 32 of the distributor so that a vertical portion of said gauge member 12 may pass between the contact points as shown by Figure X. By changing the angle or elevation of the handle 11 of the gauging instrument 10 with respect to the distributor, the wire gauge member 12 may be drawn or moved between the points 28 and 29 in any desired direction, thus giving a very efficient checking.

In Figure XI the wire gauge member 12 is shown in section to show specifically the efficient point or line contact between the parallel surfaces of the breaker points and the sides of the wire gauge member. The wire is shown dotted in two other testing positions.

In Figure XII the wire gauge 12 is shown in full lines and in respect to the contact points 28 and 29 to show the sharp line contact between said breaker points and the wire, thus giving the desired magnitude to the desired testing "touch" through the gauge 10 to the operator's hand.

In Figure XIII the wire gauge member 12 is shown in position with respect to two irregular or burned breaker point surfaces 34 and 35 to illustrate how readily the unparalled surfaces will be detected with this novel type instrument.

In Figure XIV the wire gauge member 12 is shown in contact with the burned breaker points 34 and 35, showing how the line contact between said points 34 and 35 and the gauge member 12 is destroyed.

It is apparent that, within the scope of the invention, modifications and different arrangement may be made other than is herein disclosed, and the present disclosure is illustrative merely, the invention comprehending all variations thereof.

Having thus described my invention, what I claim as new and desire to protect by Letters-Patent, is:

1. A gauge for checking clearances between parallel surfaces, including in combination, a suitable handle, and rigidly affixed to said suitable handle a formed, fixed closed loop wire gauging member having a hollow open center and generally protruding from the handle in the shape of an extended geometric figure having a plurality of cylindrical surfaces.

2. A fixed dimension gauge having in combination a suitable handle, and a loop wire gauge member of fixed diametrical size and of fixed shape, said loop consisting of a single piece of wire and rectangularly formed, the ends of said wire being rigidly secured to the end portion of said handle, said loop further forming a pluraity of straight gauging members presenting cylindrical surfaces, the diameter of said wire constituting the determinative measuring distance.

NORTON L. RICHARDS.